US010477496B2

(12) United States Patent
Kela et al.

(10) Patent No.: US 10,477,496 B2
(45) Date of Patent: Nov. 12, 2019

(54) USER DEVICE, ACCESS NODE DEVICE, CENTRAL NETWORK CONTROLLER AND CORRESPONDING METHODS

(71) Applicant: Huawei Technologies Co., Ltd., Shenzhen (CN)

(72) Inventors: Petteri Kela, Helsinki (FI); Jussi Salmi, Kista (SE); Kari Juhani Leppanen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 290 days.

(21) Appl. No.: 15/353,225

(22) Filed: Nov. 16, 2016

(65) Prior Publication Data

US 2017/0064652 A1    Mar. 2, 2017

Related U.S. Application Data

(63) Continuation of application No. PCT/EP2014/062649, filed on Jun. 17, 2014.

(51) Int. Cl.
*H04W 72/00* (2009.01)
*H04L 5/14* (2006.01)
(Continued)

(52) U.S. Cl.
CPC .......... *H04W 56/001* (2013.01); *H04B 7/024* (2013.01); *H04B 7/0626* (2013.01);
(Continued)

(58) Field of Classification Search
None
See application file for complete search history.

(56) References Cited

U.S. PATENT DOCUMENTS

2004/0179627 A1    9/2004    Ketchum et al.
2008/0267165 A1   10/2008    Bertrand et al.
(Continued)

FOREIGN PATENT DOCUMENTS

CN    1993630 A     7/2007
CN    101389092 A   3/2009
(Continued)

OTHER PUBLICATIONS

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.12.0, pp. 1-127, 3$^{rd}$ Generation Partnership Project, Valbonne, France (Mar. 2014).

(Continued)

*Primary Examiner* — Saba Tsegaye
(74) *Attorney, Agent, or Firm* — Leydig, Voit & Mayer, Ltd.

(57) ABSTRACT

The present disclosure relates to a user device, an access node device and a central network controller. The user device comprises a transceiver configured to synchronise with a radio communication network; said transceiver further being configured to broadcast a beacon signal comprising at least one reference signal to one or more access node devices of said radio communication network. The access node device comprises a transceiver configured to receive a broadcast beacon signal from a user device synchronised with said radio communication network; and further a processor configured to derive information from said received broadcast beacon signal and to use said derived information in a network procedure of said radio communication network. Furthermore, the present disclosure also relates to corresponding methods, a computer program, and a computer program product.

16 Claims, 9 Drawing Sheets

(51) Int. Cl.

| | | |
|---|---|---|
| *H04L 5/00* | (2006.01) | |
| *H04W 56/00* | (2009.01) | |
| *H04W 76/11* | (2018.01) | |
| *H04B 7/024* | (2017.01) | |
| *H04B 7/06* | (2006.01) | |
| *H04W 8/22* | (2009.01) | |
| *H04W 52/36* | (2009.01) | |
| *H04W 74/08* | (2009.01) | |

(52) U.S. Cl.
CPC .............. *H04L 5/0048* (2013.01); *H04L 5/14* (2013.01); *H04W 8/22* (2013.01); *H04W 52/365* (2013.01); *H04W 72/005* (2013.01); *H04W 74/0833* (2013.01); *H04W 76/11* (2018.02)

(56) References Cited

U.S. PATENT DOCUMENTS

| | | | |
|---|---|---|---|
| 2010/0093386 A1 | 4/2010 | Damnjanovic et al. | |
| 2010/0296464 A1* | 11/2010 | Barraclough | H04M 15/00 370/329 |
| 2011/0235597 A1 | 9/2011 | Montojo et al. | |
| 2011/0243075 A1 | 10/2011 | Luo et al. | |
| 2011/0319012 A1 | 12/2011 | Park et al. | |
| 2012/0202558 A1 | 8/2012 | Hedberg et al. | |
| 2012/0207076 A1 | 8/2012 | Suh et al. | |
| 2013/0029586 A1 | 1/2013 | Wang | |
| 2013/0029707 A1 | 1/2013 | Virta et al. | |
| 2013/0102305 A1* | 4/2013 | Liu | H04W 24/02 455/422.1 |
| 2013/0260772 A1* | 10/2013 | Kim | H04W 72/085 455/447 |
| 2014/0016565 A1 | 1/2014 | Ode et al. | |
| 2014/0256328 A1* | 9/2014 | Li | H04L 5/0051 455/444 |
| 2014/0376486 A1 | 12/2014 | Lee et al. | |
| 2017/0034841 A1* | 2/2017 | Bethanabhotla | H04W 28/08 |

FOREIGN PATENT DOCUMENTS

| | | |
|---|---|---|
| CN | 102917454 A | 2/2013 |
| CN | 103460771 A | 12/2013 |
| CN | 103533626 A | 1/2014 |
| EP | 2693817 A1 | 2/2014 |
| GB | 2493183 A | 1/2013 |
| JP | 2010508785 A | 3/2010 |
| JP | 2012530475 A | 11/2012 |
| KR | 20100058398 A | 6/2010 |
| KR | 20110040729 A | 4/2011 |
| KR | 20120076367 A | 7/2012 |
| KR | 20130128006 A | 11/2013 |
| RU | 2349042 C2 | 3/2009 |
| WO | WO 2011041552 A1 | 4/2011 |
| WO | WO 2011046353 A2 | 4/2011 |
| WO | 2012132016 A1 | 10/2012 |
| WO | WO 2013119161 A1 | 8/2013 |
| WO | WO 2013125922 A1 | 8/2013 |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36. 321, V11.5.0, pp. 1-57, 3$^{rd}$ Generation Partnership Project, Valbonne, France (Mar. 2014).

Tirronen et al., "Reducing Energy Consumption of LTE Devices for Machine-to-Machine Comunication," GC'12 Workshop: Second International Workshop on Machine-to-Machine Communications, pp. 1650-1656, Institute of Electrical and Electronics Engineers (2012).

CN/201480079908.4, Office Action, dated Mar. 19, 2019.

* cited by examiner

USER DEVICE, ACCESS NODE DEVICE, CENTRAL NETWORK CONTROLLER AND CORRESPONDING METHODS

CROSS-REFERENCE TO RELATED APPLICATIONS

This application is a continuation of International Application No. PCT/EP2014/062649, filed on Jun. 17, 2014, the disclosure of which is hereby incorporated by reference in its entirety.

TECHNICAL FIELD

The present disclosure relates to a user device and corresponding network devices for wireless communication. Furthermore, the present disclosure also relates to corresponding methods, a computer program, and a computer program product.

BACKGROUND

In conventional systems the Random Access (RA) procedure is the first procedure where the radio network of a wireless communication system knows that a User Device (UD) is trying to establish a connection to the network. At this stage the UD does not have any resource or channel available to inform the network about its desire to connect, so the UD will send its request over a shared medium. There might be many other UDs in the same area sending the same request, in which case there is also a possibility of collisions among the requests coming from different UDs. Such RA procedure is called contention based RA procedure. After a successful RA procedure, the UD is able to start data transmissions with the connected Access Node (AN). The RA procedure for Long Term Evolution (LTE) is mainly specified in 3GPP TS 36.321 and in TS 36.213.

LTE uses the RA procedure for a UD (or User Equipment (UE) in LTE) to make a connection to an AN of the radio network and to obtain the timing advance for the Uplink (UL). Additionally, the RA handles collisions that might happen when two or more UDs are trying to make a connection at the same time. In conventional systems, after each handover decision, the UD performs the connection establishment to the new AN through the RA procedure. The RA is started with a preamble message from the UD. If the AN can decode the preamble successfully, it sends the RA response to the UD, which contains the UL timing advance, a temporary Cell Radio Network Temporary Identifier (C-RNTI) value and a UL grant for Msg3 (the 3GPP term for first scheduled UL transmission in contention based RA procedure), which is to be used for Radio Resource Control (RRC) connection establishment.

Another aspect is the mobility of a UD which is already in connected state. In existing legacy systems the handover decisions are based on measurements made by the UDs during time periods called measurement gaps. The locations of the measurement gaps are specified by network specified parameters. Currently, e.g. in LTE systems, mobility and RA procedure issues are solved for large cells, where UNs are not constantly making handovers from one cell to another. Therefore in LTE, the UD keeps track of the macro-cell ANs and decide which one of them provides the best signal. However, when a handover takes place, the UD is required to establish connection to the new AN through the RA procedure.

SUMMARY

An objective of the present solution is to provide a solution which mitigates or solves the drawbacks and problems of conventional solutions.

According to a first aspect of the disclosure, the above mentioned and other objectives are achieved with a user device comprising a transceiver configured to synchronise with a radio communication network; said transceiver further being configured to broadcast a beacon signal comprising at least one reference signal to one or more access node devices of said radio communication network.

According to a second aspect of the disclosure, the above mentioned and other objectives are achieved with an access node device for a radio communication network, said access node device comprising:
a transceiver configured to receive a broadcast beacon signal from a user device synchronised with said radio communication network; and
a processor configured to derive information from said received broadcast beacon signal and to use said derived information in a network procedure of said radio communication network.

According to a third aspect of the disclosure, the above mentioned and other objectives are achieved with a central network controller for a radio communication network, the central network controller comprising:
a transceiver configured to receive, from at least one access node device of said radio communication network, information derived from a beacon signal originally broadcasted by a user device;
a processor configured to based on the information received from said at least one access node device decide which access node device (or access node devices) of said radio communication network shall connect to said user device, and to assemble connection setup information indicating at least one access node device of said radio communication network to which said user device shall establish a connection; and
wherein said transceiver is further configured to forward said connection setup information to at least one access node device which shall establish a connection to said user device.

According to a fourth aspect of the disclosure, the above mentioned and other objectives are achieved by a method in a user device comprising the steps of:
synchronising with a radio communication network; and
broadcasting a beacon signal comprising at least one reference signal to one or more access node devices of said radio communication network.

According to a fifth aspect of the disclosure, the above mentioned and other objectives are achieved by a method in an access node device for a radio communication network, the method comprising the steps of:
receiving a broadcast beacon signal from a user device synchronised with said radio communication network;
deriving information from said received broadcast beacon signal; and
using said derived information in a network procedure of said radio communication network.

According to a sixth aspect of the disclosure, the above mentioned and other objectives are achieved by a method in a central network controller for a radio communication network, the method comprising the steps of:
receiving from a plurality of access node devices of said radio communication network information derived from a beacon signal originally broadcasted by a user device;

deciding based on the information received from at least one access node device which access node device shall connect to said user device;

assembling connection setup information indicating at least one access node device of said radio communication network to which said user device shall establish a connection; and forwarding said connection setup information to at least one access node device which shall establish a connection to said user device.

The present disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

A reference signal is a signal whose contents is perfectly known to both sender and intended receiver of a communication link end. Therefore, the reference signal can e.g. be used to determine the channel coefficients, which can be used for multiple things, including channel equalization, precoding, positioning, signal quality estimation, modulation and coding scheme selection, etc. With the reference signal UD positioning is also possible.

The present solution has at least the following advantages over conventional solutions.

Reduced power consumption in the UD since the network instead of the UD can handle mobility and channel quality related issues by measuring the present beacon signal.

Allowing more agile RA procedure since the network further can instantly measure UD location and channel during RA procedure and decide the serving AN(s) for the UD. The present solution therefore also implies improved UD positioning and UD movement prediction due to the beacon signal.

Moreover, improved mobility control is possible as the network can monitor the UD and direct data traffic via closest AN(s) to the UD. This also means simplified UD processing and signalling by hiding handovers from the UD.

Embodiments of the present disclosure also enable up-to-date CSI for advanced CoMP and Multi User Multiple Input Multiple techniques at all neighbouring ANs in Time Division Duplex (TDD) systems, including the interference estimates.

Furthermore, embodiments of the present disclosure also enables more accurate interference coordination since every possible link is well known because every AN can receive beacons from all UDs within beacon's range. Hence interference can be coordinated, which improves spectral efficiency. This is an important aspect for dense networks.

According to an implementation form of the first aspect said beacon signal further comprises identity information of said user device. When the beacon signal comprises identity information, the user device can be identified when beacon signal is not scheduled. For example, when the user device is transmitting beacon signals in contention based manner like in RA procedure. Another aspect is that when the user device is sending beacon signals rarely only for mobility tracking purposes, the user device can be identified also after the user device has moved to another area.

According to an implementation form of the first aspect said beacon signal further comprises one or more information elements in the group comprising: capabilities of said user device, transmit power level of said beacon signal, power headroom for said beacon signal, channel state information associated with said beacon signal, and service provider identity for said user device. By including capability information in the beacon signal the network can know if it can support the user device or not, e.g. in RA procedure. Beacons signals could be also used to pass power level and power headroom information if beacon transmit power is dynamically controlled. If the network needs CSI information from downlink channel, then beacon could pass CSI information. The point with this kind of beaconing in TDD system is to get rid of CSI information reports. For example, if the user device sends CSI reports, the network might be able to estimate user experienced interference leakage coming from neighbouring access nodes.

According to an implementation form of the first aspect said user device is configured to:

when not being connected to any of the access node devices of said radio communication network include identity information of said user device into said beacon signal and transmit said beacon signal as part of a random access procedure; and when being connected to at least one access node device of said radio communication network omit including said identity information into said beacon signal. When the user device is not known by the network, some identifier is needed. However, when the user device is connected and scheduled, the identifier would consume physical resources and is therefore omitted.

According to an implementation form of the first aspect said transceiver further is configured to broadcast said beacon signal using a dedicated broadcast channel of said radio communication network. By using a dedicated broadcast channel all access nodes in a coordinated area can receive the beacon signals, without the need for scanning all available channels.

According to an implementation form of the first aspect said transceiver further is configured to: receive a beacon response signal including connection setup information, and establish a connection with (at least one access node of) said radio communication network based on said connection setup information. Thereby, connection to the user device can be done. The beacon response signal may be transmitted from the access node to which the transceiver shall connect to or may be also transmitted by another access node of said radio communication network.

According to this implementation form said transceiver further is configured to: receive a beacon control signal including beacon transmission interval control information, and broadcast beacon signals according to said beacon transmission interval control information. Thereby, the beacon signalling can be optimised to e.g. reduce overhead.

According to an implementation form of the first aspect said beacon signals further comprise sounding reference signals.

According to an implementation form of the second aspect said network procedure comprises at least one of a random access procedure, a joint procedure for assigning a serving access node device to said user device, a channel estimation procedure, a radio resource management procedure, or mobility control procedure of said user device. Thereby, the information in the beacon signal can advantageously be used in different network procedures.

According to an implementation form of the second aspect said transceiver further is configured to transmit a beacon control signal to said user device, said beacon control signal comprising beacon transmission interval control information. Thereby, the beacon signalling can be optimized e.g. to reduce signalling overhead.

According to an implementation form of the second aspect said transceiver further is configured to forward said derived information to one or more further access node devices of said radio communication network, and to receive further information derived from said beacon signal from one or more further access node devices of said radio communication network; and said processor is configured to, based on the derived information and the received information, decide which of the access node devices of said radio communication network shall connect to said user device. Thereby, coordinated network procedures can performed in a distributed manner, such as coordinated beamforming, resource scheduling and interference control.

According to an implementation form of the second aspect said transceiver further is configured to forward said derived information to a central network controller, and to receive connection setup information from a central network controller, the connection setup information indicating at least one access node device of said radio communication network to which said user device shall establish a connection. Thereby, coordinated network procedures can performed in a centralized manner, such as coordinated beamforming, resource scheduling and interference control.

According to an implementation form of the second aspect said transceiver further is configured to transmit a beacon response signal to said user device, said beacon response signal comprising connection setup information indicating at least one access node device of said radio communication network to which said user device shall establish a connection.

It should be realized that the present methods can be modified, mutatis mutandis, to fully correspond to all embodiments of the present transmitter device and receiver device.

It should be noted that further applications and advantages of the disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

In the future, dense cellular network deployment will be one key aspect to increase network capacity and data rates. As legacy wireless cellular network systems are relying on UD (user device) measurements in mobility issues, the UD has to constantly measure own and neighbouring cells so the UD can choose best serving cell candidates and report measurements to the network. Because the AN cannot transmit or receive data during measurement gap this is not efficient and measuring during measurement gaps placed in Discontinuous Reception (DRX) inactive time consumes energy. Additionally heavy handover and connection establishment processes consume time and frequency resources and energy.

It is also expected that the UDs are expected to be simultaneously served by multiple ANs, instead of a single AN. It is then much more efficient and sometimes even necessary for the network to have full control over which ANs should serve a particular UD. In such scenarios it would be computationally demanding and inefficient for the UDs to keep track of all the ANs and provide measurement results for the network. Therefore the concept of a handover must be rethought to allow seamless mobility, even for high velocity UDs. In addition, in dense deployments with inter-AN distances less than 100 meters, the UL/DL timing difference is not significant and could be handled only with cyclic prefix. Therefore, there is no need for the UD to obtain the initial UL timing advance through RA procedure as is currently done in LTE after each handover.

Therefore, embodiments of the present disclosure allow a UD-centric, rather than the conventional cell-centric or network-centric, control of the radio network. An objective is to change the burden of mobility control from the UDs to the radio network. In this way, the UDs reduce energy consumption and the network is capable of serving the UDs in the best possible way without extra signalling to carry UD measurements or control information to the UD to handle cell changes. This mean that the UD does not need to be aware of the "cell", or rather the AN or ANs that serve the UD. In a UD-centric approach with Multi User Multiple Input Multiple Output (MU-MIMO) the concept of cell becomes unnecessary.

A user device (UD) in this disclosure should mean any communication device which is arranged to connect to a wireless communication system for communication. Examples of such devices are mobile phones, smart phones, tablets, laptops, etc.

As mentioned above the proposed solution makes the RA procedure and UD mobility in e.g. small-cell dense deployment networks more agile. There is no need for the UDs to perform measurements of the network for handover purposes, and no RA procedure is necessary after each handover—only during the initial connection establishment to the network. While connected to the network, the UD only needs to know at which time it is expected to transmit, and by receiving the present beacon signals from the UD at designated times the network takes care of the necessary service parameters. The proposed concept is very useful in TDD systems, since it enables the utilization of channel reciprocity to estimate the Downlink (DL) Channel State Information (CSI) (corresponding to the quality of the channel) based on the UL beacon signals and no explicit CSI feedback is required. However, it is to be pointed out that embodiments of the present disclosure are not limited to TDD systems.

Background of embodiments of the present disclosure lay in the inefficiency of conventional techniques to handle connection establishment and UD mobility in wireless cellular networks. Conventional technologies are designed for rather large radius cells where the UD is not typically constantly doing handovers. However in the future systems the densification of cellular networks is one key aspect to provide high data rates and to handle an increasing number of UDs in densely populated areas, such as urban areas. In such radio networks it has been realised by the inventors that it is more efficient for the network to be aware of the UDs as opposed to each individual UD trying to decide which of the—potentially overlapping—AN or networks the UD should use according to conventional solutions. Therefore, embodiments of the present disclosure provide, among other things, more efficient techniques for connection establishment and mobility control compared to conventional solutions.

The present UD-centric wireless network concept relies on network controlled mobility and connection establishment. This is based on beacon signals broadcast by a UD, from which a possible network controller and/or (neighbouring) ANs of the network can measure the UD location and select the best serving AN or a set of multiple serving ANs for a particular UD. Additionally, inter-AN interference could be coordinated by a central network controller, which would know the position, signal quality and the predicted movement of the UDs of the network. Alternatively, the ANs could share information between neighbouring ANs and coordinate UD's mobility without a higher controller entity in a distributed manner.

Embodiments of the present disclosure rely on various broadcast beacon signals, which are not dedicated to a specific receiver AN. Beacon signals are broadcast by the UDs to enable UD-centric network control. The beacon signal may therefore according to an embodiment be broadcasted in a dedicated broadcast channel of the radio communication network. Further, the beacon signal may also comprise control data for other network aspect such as scheduling request, etc.

Figure 1:
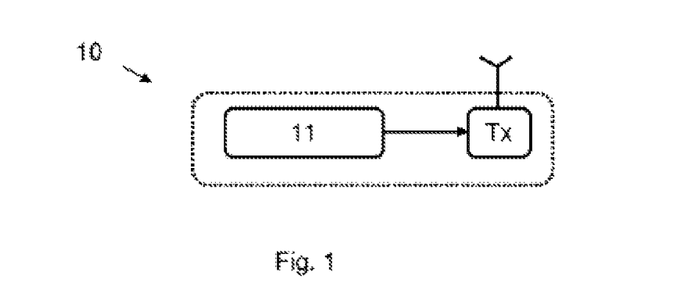
FIG. 1 shows a user device according to an embodiment of the present disclosure.

FIG. 1 shows a UD 10 according to an embodiment of the present disclosure. The UD 10 comprises a transceiver 11 configured to synchronies with a radio communication network 20 (shown in FIG. 5). The transceiver 11 is further configured to broadcast a beacon signal comprising at least one reference signal to one or more access node devices 30 of the radio communication network 20. In FIG. 1 the UD 10 comprises a transmit antenna unit (Tx) which is used for transmissions of the beacon signal.

Figure 2:
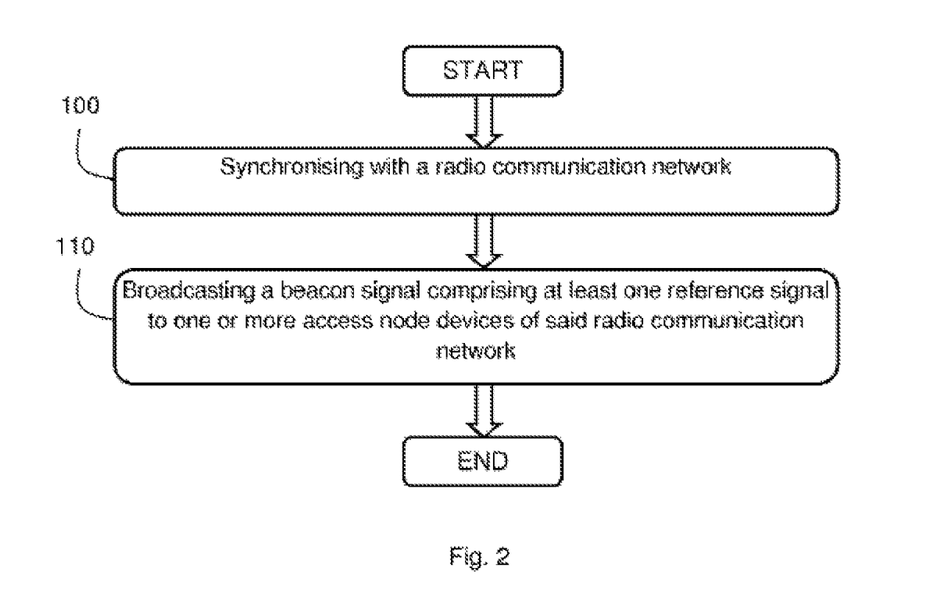
FIG. 2 shows a method in a user device according to an embodiment of the present disclosure.

FIG. 2 illustrates a flow chart for a corresponding method in a UD 10. The present method comprises the steps of:
  100 Synchronizing with a radio communication network; and
  110 Broadcasting a beacon signal comprising at least one reference signal to one or more access node devices of said radio communication network.

Figure 3:
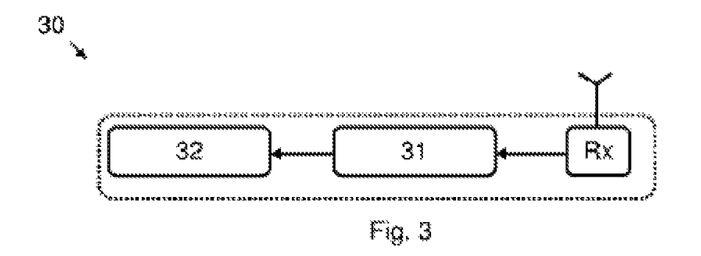
FIG. 3 shows an access node device according to an embodiment of the present disclosure.

Furthermore, FIG. 3 shows an AN 30 according to an embodiment of the present disclosure. The AN 30 comprises a transceiver 31 configured to receive a broadcast beacon signal from a user device 10 synchronized with a radio communication network 20. The AN further comprises a processor 32 configured to derive information from the received broadcast beacon signal and to use the derived information in a network procedure of the radio communication network 20. The AN 30 also comprises in this example a receiver antenna unit (Rx) for receiving beacon signals from one or more UDs. An AN is a radio network device by which the UD can access the network. Therefore, the AN is part of the network and has the functions and capabilities for providing such connection. It can e.g. be a base station, a radio head unit, etc.

The network procedure may be at least one of a random access procedure, a joint procedure for assigning a serving AN device to the user device 10, a channel estimation procedure, a radio resource management procedure, or mobility control procedure of said user device 10.

Figure 4:
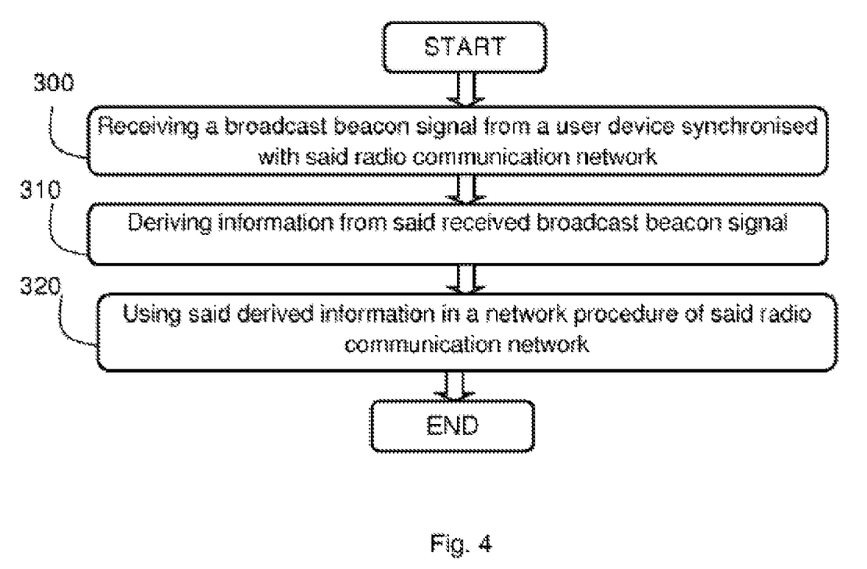
FIG. 4 shows a method in an access node device according to an embodiment of the present disclosure.

FIG. 4 illustrates a flow chart for a corresponding method in the AN 30 according to an embodiment of the present disclosure. The present method comprises the steps of:
  300: receiving a broadcast beacon signal from a user device synchronized with said radio communication network;
  310: deriving information from said received broadcast beacon signal; and
  320: using said derived information in a network procedure of said radio communication network.

Figure 5:
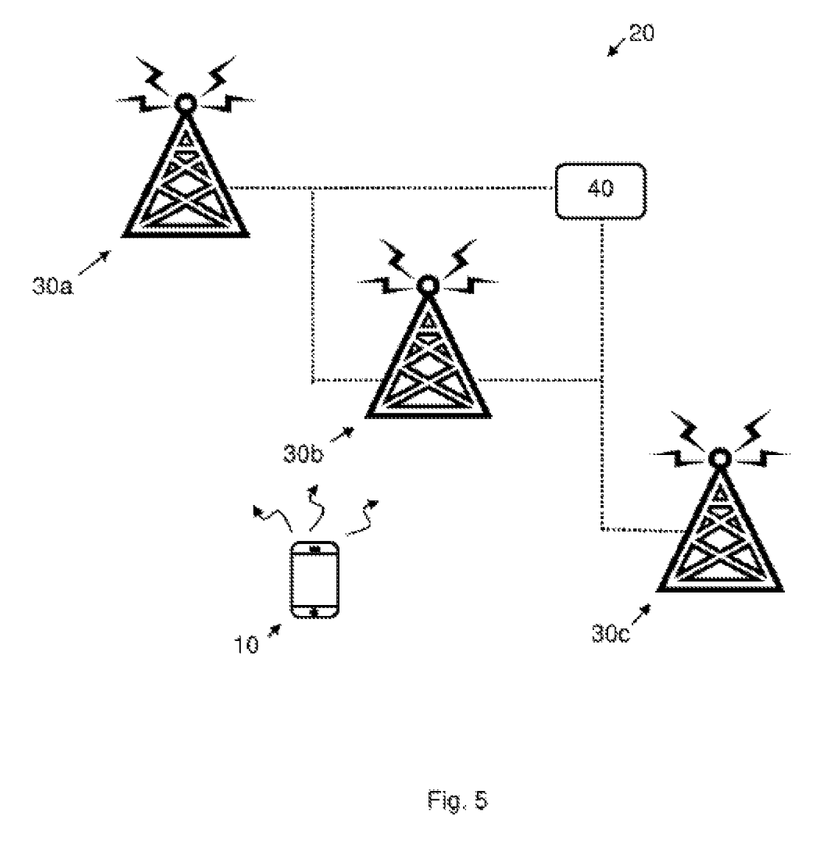
FIG. 5 illustrates a user device broadcasting beacon signals in a wireless communication system and how a plurality of ANs receives the beacon signal.

FIG. 5 shows how a UD 10 broadcasts beacon signals in a wireless communication system including a radio network 20 to one or more ANs of the radio network which has communication interfaces between the different network devices. The UD 10 broadcasts the beacon signal in e.g. a dedicated beacon broadcast channel. ANs 30a. 30b, 30c receive in this case the beacon signal and use the information in the beacon signal for any suitable network procedure. In FIG. 5 also a central network controller 40 is part of the radio network 20. The ANs 30a. 30b, 30c can forward information in the beacon signal to the central network controller 40 which may assign one or more ANs to the UD by selecting ANs, determining connection setup information and signalling the connection setup information to selected ANs. The selected AN can after reception of the connection setup information initiate relevant network procedure(s).

However, if the network procedure is RA there should be at least some temporary identifier in the beacon signal, which means that the beacon signal further comprises identity information of the UD according to an embodiment.

Once the UD is connected to the radio network the beacon signals can be scheduled (by the network) and then only a specific reference signal message is enough to do measurements and keep track of the UDs of the system. Furthermore, the beacon signal may comprise Sounding Reference Signals (SRSs) as reference signals, e.g., when such an embodiment is used with legacy LTE.

Furthermore, when the UD is in connected mode (or in some other mode where user is identified) there can be e.g. scheduled beacons utilizing just few subcarriers so UDs can be located and scheduled efficiently in spatial domain, and e.g. another beacon signal sent by scheduling candidates utilizing whole band or some sub-band. By receiving and measuring these broader beacons the ANs 30 or the central network controller 40 can further optimize dynamic scheduling decisions and calculate precisely precoders for e.g. MU-MIMO or CoMP transmissions.

According to an embodiment the UD is configured to: when not being connected to any of the access node devices include identity information of the UD into the beacon signal and transmit the beacon signal as part of a RA procedure; and when being connected to at least one AN device omit including said identity information into said beacon signal.

For example, after a UD has been synchronized with the network and received the necessary system information, the UD starts connection establishment by sending a "RA beacon message" in a network specified random access channel. The frequency and time allocations for this RA channel are obtained from the system information received before the RA procedure starts. For Random Access Channel (RACH), e.g. a certain time slot of the whole band could be used so the network can measure and estimate UD's full system bandwidth usage efficiency. Simultaneously the network can update the CSI at all of the cooperating ANs within the range.

The beacon signal for RA may contain an individual UD Identity (ID), possibly also UD capabilities and a reference signal or it could just contain a generated preamble sequence and the reference signal (but the beacon is not addressed to a certain AN, i.e. is free of a destination address).

Alternatively, the beacon signal for RA could also include an address or identification of the Service Provider (SP) associated with the UD. This would allow the SP to reach the UN for DL traffic. When an AN detects a beacon signal for RA, it can forward information derived from the beacon signal to a central network controller (connected to all the ANs in a certain area), which waits a small period of time in order to detect whether other ANs have received the same beacon signal for RA and forwarded the information to the central controller. After that, the central controller can select the best serving cell (covered by an AN) or a set of multiple serving cells (covered by a plurality of ANs) for the UD, e.g. in the case of CoMP, based on the reference signal measurements provided by the ANs. Afterwards, one AN is selected to send the acknowledgments (such as a beacon response signal) to the UD. Such beacon response signal may, but not necessarily, indicate one more ANs to which the UD shall establish a connection to. The AN which sends such a beacon response signal does not necessarily need to be one of the ANs to which the UN shall connect, but it can be.

Figure 6:
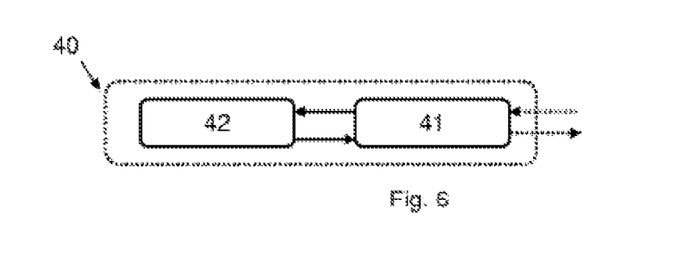
FIG. 6 shows a central network controller according to an embodiment of the present disclosure.

Accordingly, embodiments of the present disclosure also relate to a central network controller 40 for a radio communication network 20. With reference to FIG. 6 the central network controller 40 comprises a transceiver 41 configured to receive, from at least one access node device 30 of the radio communication network 20, information derived from a beacon signal originally broadcasted by a user device 10. The central network controller 40 further includes a processor 42 configured to, based on the information received from the at least one access node device 30, decide which access node device shall connect to the user device 10, and to assemble connection setup information indicating at least one access node device of the radio communication network 20 to which the user device 10 shall establish a connection. Further, the transceiver 41 is also configured to forward the connection setup information to at least one access node device 30 which shall establish a connection to the user device 10.

Figure 7:
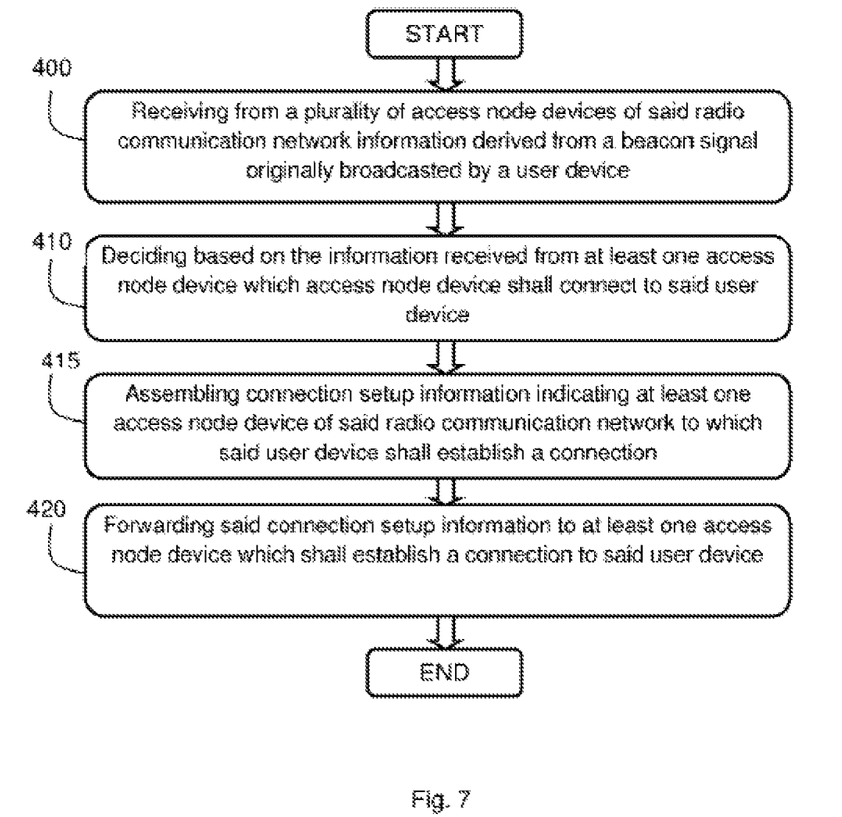
FIG. 7 shows a method in a central network controller according to an embodiment of the present disclosure.

FIG. 7 illustrates a flow chart for a corresponding method in central network controller 40. The present method comprises the steps of:

400: receiving from a plurality of access node devices of said radio communication network information derived from a beacon signal originally broadcasted by a user device;

410: deciding based on the information received from at least one access node device which access node device shall connect to said user device;

415: assembling connection setup information indicating at least one access node device of said radio communication network to which said user device shall establish a connection; and

420: forwarding said connection setup information to at least one access node device which shall establish a connection to said user device.

According to further embodiments, e.g. in a CoMP scenario the transceiver may forward the connection setup information to a plurality of access node devices which shall establish a connection to the user device 10.

As mentioned above, FIG. 5 also shows how ANs forward information derived from received beacon signals to a central network controller 40 which after suitable processing forwards connection setup information to at least one access node device which shall establish a connection to the user device 10. The present AN is therefore further configured to receive the connection setup information and connect to the UD according to the connection setup information.

Optionally, the acknowledgment could be transmitted in a CoMP manner from all ANs that received the RA beacon with sufficient signal quality that allowed channel estimation.

Another solution is to use a more distributed approach (in which no central controller is involved) where the ANs could decide jointly between neighbouring ANs which one of them is the best for serving each UD. Note that the acknowledgment in this case does not need to be sent immediately after reception of a beacon signal, but rather in a later time window reserved for that purpose. This allows the decision about the serving AN to be made either in centralized or distributed manner.

Moreover, during RA, the UD can either i) utilize the network reference signal based measurements to approximate a proper transmit power, ii) use fixed power for RA beacon signals, iii) utilize a power ramp-up until a response is received. Therefore, this information can be included in the present beacon signal.

Additionally, the UD can include the transmit power level or power headroom information into a beacon signal for more accurate network driven transmit power control, e.g. through the acknowledgment/response messages from AN. To avoid collisions, random back-off time can be utilized if beacon response signal is not received in time. Beacon response signal sent from the AN(s) to the UD could contain allocation for RRC connection request or the network could transmit RRC connection setup without separate request using specified time/frequency resources.

When the RRC connection is established, the UD could start sending Sounding Reference Signal (SRS) beacons (or any other suitable reference signals) to the radio network in specified time/frequency slots. The SRS beacons are scheduled by network and shall contain pilot signal, from which the network can estimate UDs channel conditions. To get more efficient band usage also frequency hopping or pseudo-orthogonal codes could be utilized for SRS beacons. However, in really dense networks with only a few UDs per AN, it could be beneficial to use the whole operating bandwidth for beacon transmissions in certain time slots for precise channel measurements. On the other hand, while tracking the mobile movement in the idle mode, or if multiple UDs need to be scheduled for the same beaconing period, also multiple access through e.g. OFDMA combined with frequency hopping could be utilized.

The SRS beacons could be received and forwarded to the central controller by all the ANs in the receiving range. The central controller could be able to schedule the SRS beacons so that collisions should not happen between nearby UDs. Based on the beaconing information received from multiple ANs, the central controller can then measure the UNs' uplink signal quality, position, predict UN movement, predict DL interference to other UNs and choose appropriate DL/UL cooperation modes for the ANs accordingly.

The position estimation can be based on e.g. trilateration using available information (signal strength, time of arrival, etc.). The UD movement can be predicted e.g. based on position history, or estimated velocities from the observed Doppler shifts in the received beacon signals. The inter-cell interference can be estimated based on the fact that the ANs can estimate the CSI to each UD from the SRS beacons. This allows them (or the central controller) to evaluate how much interference (leakage) the DL transmissions cause to the UDs which are not being served by the particular ANs. Thus, the central controller can guide the AN antennas, perform handover decisions, inter-cell interference coordination and forward transmitted data to the right ANs. Alternatively, a mesh approach (without a central controller) can be utilized and the ANs could handle the UN mobility issues by communicating with the neighbouring ANs.

The interval of beacon signals broadcasted by the UD can be dynamic and controlled by the radio network according to an embodiment. Therefore, the present AN can further be configured to transmit a beacon control signal to the user device 10, which includes beacon transmission interval control information. The UD 10 receives the beacon control signal and broadcasts beacon signals according to said beacon transmission interval control information comprised in the received beacon control signal.

Hence, a more frequent beacon transmission interval could be assigned to UDs with high mobility. On the other hand stationary UDs, such as infrastructure related sensors (e.g., power meters, etc.) would not need so frequent beacon transmission intervals. Also different types of beacon signals with different intervals could be utilized, e.g. between idle and connected modes, i.e. related to UDs discontinuous transmission cycle.

By receiving and measuring beacon signals broadcast by UDs of the system, the radio network can form a dynamic map based on the UDs locations and experienced interference, which can be used for link adaptation and thus reducing UD's need for measurements and measurement reporting towards the radio network.

Figure 8:
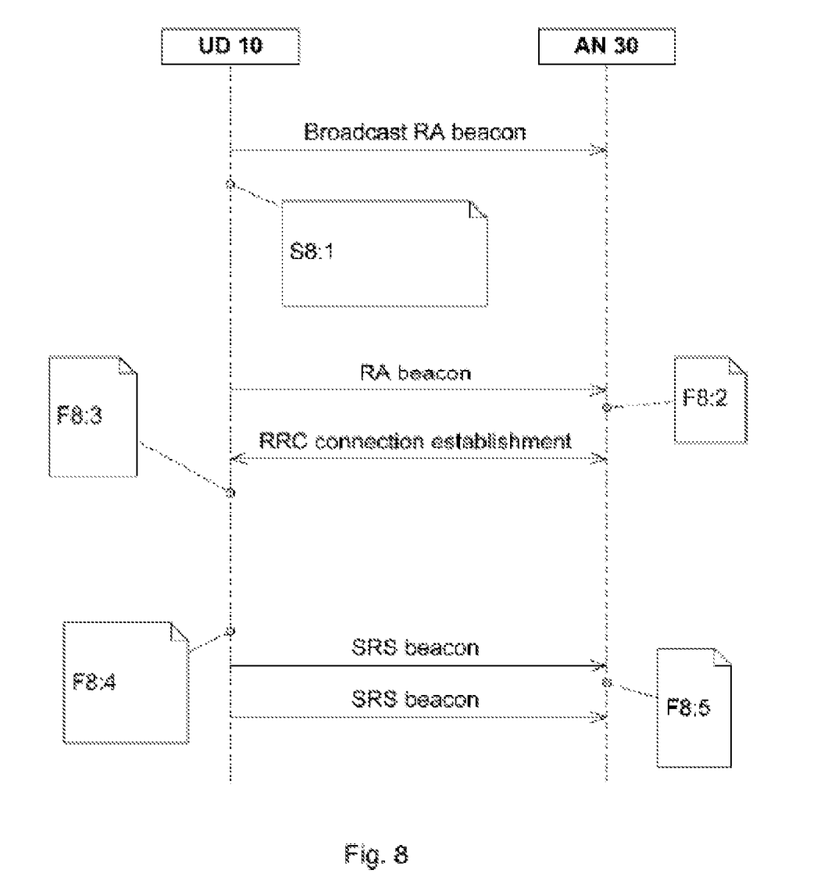
FIG. 8 illustrates an example of beacon signalling in AN mesh network.
Figure 9:
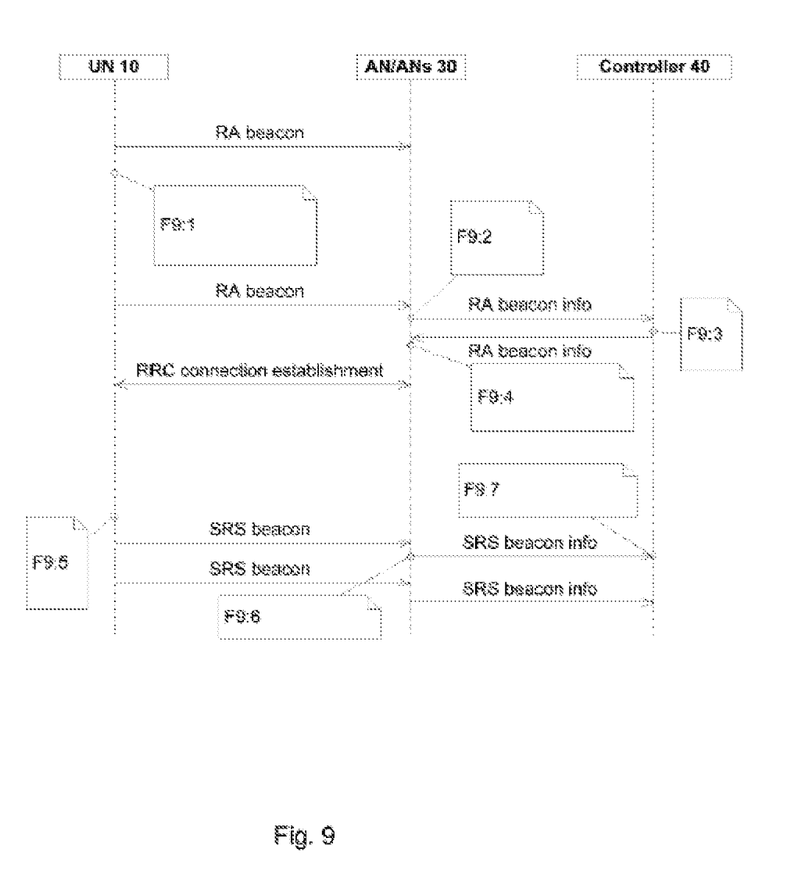
FIG. 9 illustrates an example of beacon signalling with a central network controller.

FIG. 8-11 illustrate examples of how beacon messages from the UDs can be utilized in dense small-cell deployment. The examples in FIGS. 8 and 9, shows the use case where the RA beacon includes at least a unique UD ID and the UD capabilities, such as supported frequency bands, supported communication protocols, etc.

Figure 10:
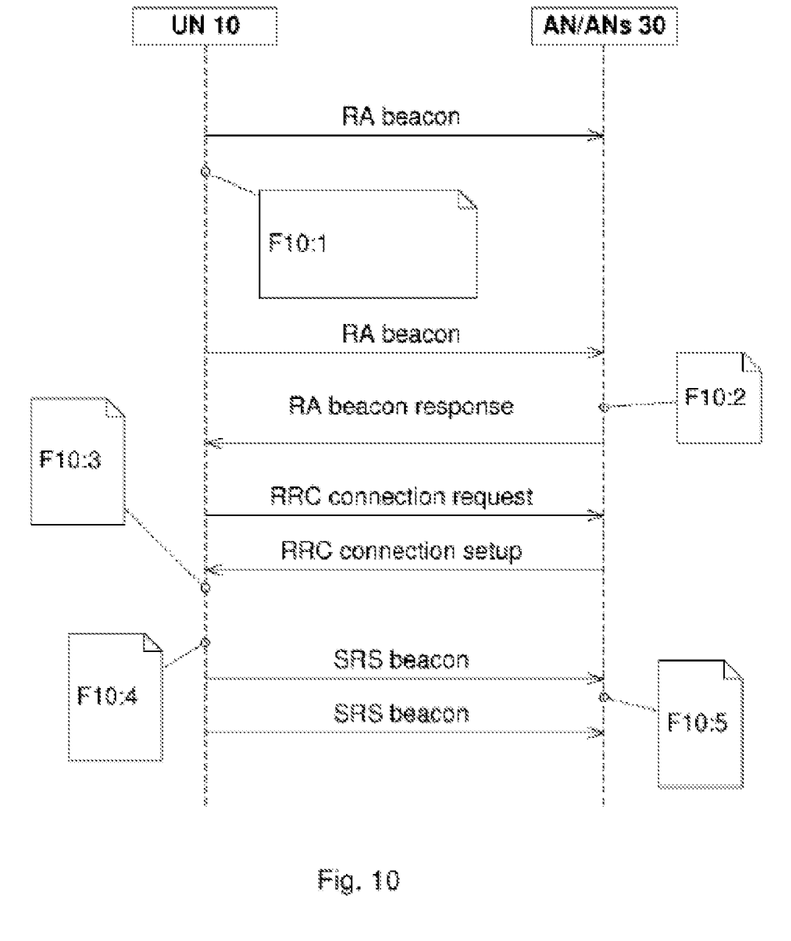
FIG. 10 illustrates another example of beacon signalling in AN mesh network.
Figure 11:
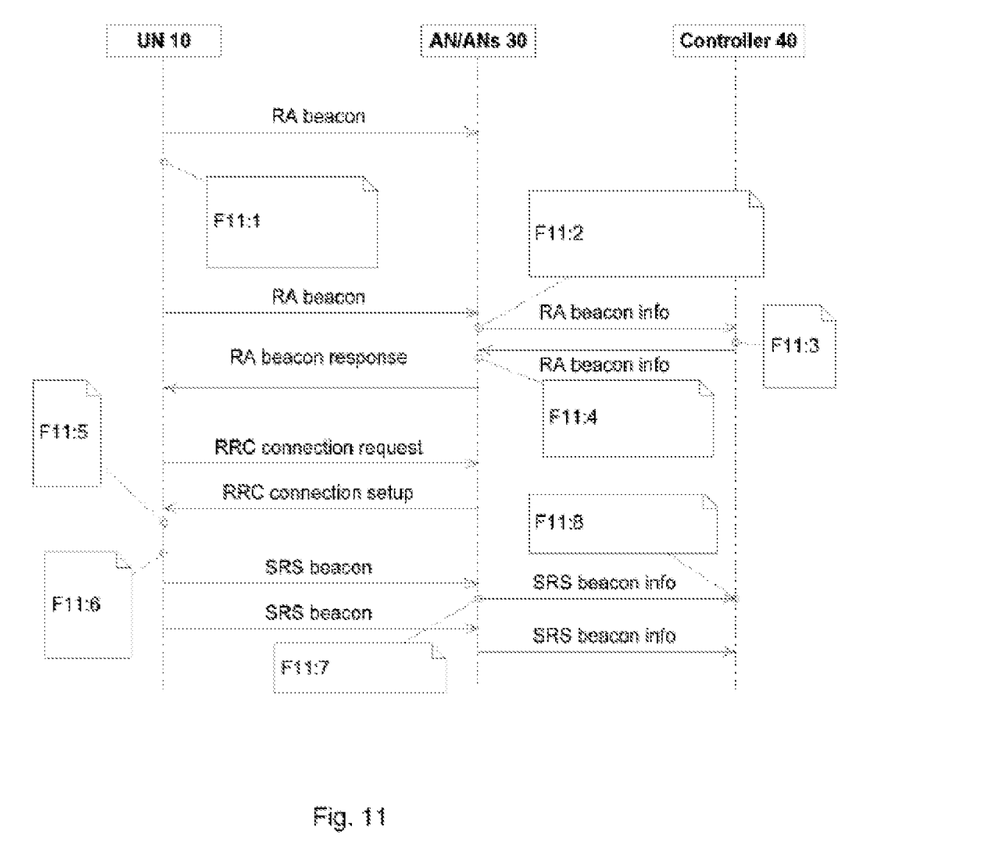
FIG. 11 illustrates an example of beacon signalling with a central network controller.

When a UD without RRC connection established starts connection establishment, the UD starts sending beacon signals for RA utilizing frequency and time resources dedicated to random access transmissions. The UD can obtain RA resource slots e.g. by obtaining system information blocks transmitted by ANs periodically. Once one or multiple ANs discover the UD, RRC connection can be established. The UD with RRC connection can then start sending reference signal beacons on allocated frequency and time resources so that ANs can keep track of the UD and measure channel conditions for the same. In FIGS. 8 and 10 the ANs are in a mesh like network. In FIGS. 9 and 11 the radio network is controlled by a central control entity.

In FIG. 8 the UD 10 broadcasts a RA beacon signal which is received by one or more ANs 30. At F8:1 the UD waits for RA beacon response and retransmits a beacon after back off time if no response received. At F8:2 one AN is assigned to take UD context and establish connection with the UD. At F8:3 the UD 10 has dedicated RRC parameters and the UD 10 can start sending SRS beacons. At F8:4 The UD 10 transmits periodical SRS beacons according to dedicated RRC parameters or beacon allocation grants interspersed with data transmissions. At F8:5 neighbouring ANs share SRS beacon measurements and load results. Handover can be requested by an AN which can serve the UD 10 better.

In FIG. 9 the UD 10 broadcasts a RA beacon signal which is received by one or more ANs 30. At F9:1 the UD 10 waits for RA beacon response and retransmits a beacon after a back off time if no response is received. At F9:2 every AN 30 which the received the beacon forwards RA beacon information to a central network controller 40. The information may contain parameters like e.g. reception time, signal level, SP ID, UD ID, etc. At F9:3 the controller waits if some other AN has got same beacon with better signal quality, and the response goes through best hyper cell AN. At F9:4 one AN is assigned to take UD's context and establish connection with the UD 10. At F9:5 the UD 10 transmits periodical SRS beacons according to dedicated RRC parameters or beacon allocation grants interspersed with data transmissions. At F9:6 every AN forwards SRS beacon information to the controller 40. At F9:7 the controller 40 gathers beacons from ANs and makes mobility decisions for the UD based on the SRS beacon measurements. As an example, the controller 40 can initiate a handover of the UD 10 from one AN to another based on the SRS beacon measurements.

In FIG. 10 the UD 10 broadcasts a RA beacon signal which is received by one or more ANs 30. At F10:1 the UD waits for RA beacon response (which may include UD ID, RRC connection request, etc.) and retransmits a beacon after a back off time if no response is received. At F10:2 one AN is assigned to take UD's context and establish connection with the UD. At F10:3 the UD 10 has dedicated RRC parameters and the UD 10 can start sending SRS beacons. At F10:4 the UD transmits periodical SRS beacons according to dedicated RRC parameters or beacon allocation grants interspersed with data transmissions. At F10:5 neighbouring ANs share SRS beacon measurement and load results. Handover can be requested by an AN which can serve the UD 10 better.

In FIG. 11 the UD 10 broadcasts a RA beacon signal which is received by one or more ANs 30. At F11:1 the UD 10 waits for RA beacon response and retransmits a beacon after a back off time if no response is received. At F11:2 every AN forwards RA beacon information to the controller 40. The information may contain parameters like e.g. reception time, signal level, SP ID, UN ID, etc. At F11:3 the controller waits if some other AN has got same beacon with better signal quality and a response goes through best hyper cell AN. At F11:4 one AN is assigned to take UD's context and establish connection with the UD. At F11:5 the UD has dedicated RRC parameters and the UD can start sending SRS beacons. At F11:6 the UD transmits periodical SRS beacons according to dedicated RRC parameters or beacon allocation grants interspersed with data transmissions. At F11:7 every AN forwards SRS beacon to the controller. At F11:8 the controller gathers beacons from ANs and makes mobility decisions for UD based on SRS beacon measurements.

In FIGS. 8 and 9 the UD utilizes beacon signals for RA including required UD information so that network can identify the UD.

In the examples in FIGS. 10 and 11, the UD case where beacon signal for RA includes at least RA preamble sequence including a generated random UN identifier is illustrated. The functional differences between the examples in the FIG. 8-11 are in the RRC connection establishment. In FIGS. 8 and 9, the UDs have predefined identifiers and therefore collisions, where the same AN receives two or more preambles with the same identifier, should be impossible. If random preamble sequence is randomly selected it is possible that two UDs end up using the same identifier. Therefore, in FIGS. 9 and 10 collision cases of preambles are taken into account. For example if two UDs end up sending RRC connection request at the same time, only one of them will get the response. The other one will start RA procedure from the beginning after a random back-off time.

In FIGS. 8 and 10 the UDs are sending more LTE RA preamble-like beacon signals for RA. Once an AN discovers a UD trying to establish RRC connection, the AN starts a handshaking process so that unique identifier can be assigned for the UD and RRC connection can be established. In FIGS. 9 and 11 the separate controller node 40 receives beacon information and makes decisions about serving AN or multiple serving ANs for the radio network.

In the following, a comparison of power consumption between LTE and the proposed solution has been calculated. It is assumed that an LTE UD (or rather a UE in LTE terminology) is reporting its CSI/PMI/RI on PUCCH every 10 ms only during active time, and the measurement gap interval is 40 ms. The assumption is that the measurement gaps would be placed to DRX inactive period if possible. The DRX Active Time is set for 1 ms, so a 1 ms DRX cycle means constant DL reception. For a network which would use beacons for UNs mobility and channel estimation, a UD would in this example send a total of 10 µs beaconing every 1 ms during Active Time and 10 µs beaconing every 100 ms during opportunity for DRX (i.e., UD's possibility for sleep). The results are shown in FIG. 12.

Figure 12:
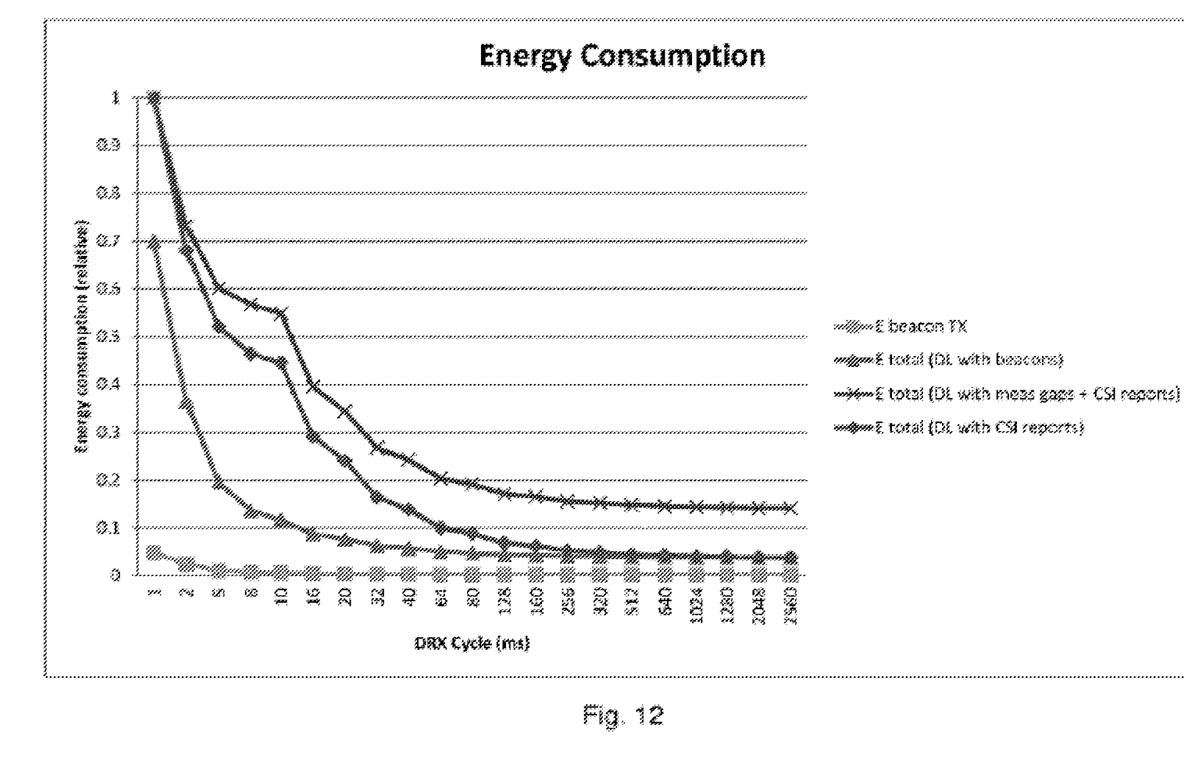
FIG. 12 shows performance results of embodiments of the present disclosure.

It can be seen in FIG. 12 that even though the TX consumes more energy than the RX, the beaconing actually could consume quite low amount of energy compared to frequent CSI reporting and measurement gap utilization. This is due to the relatively low duty cycle. During constant reception the power consumption is equal with these parameters.

Embodiments of the present disclosure are intended for the coming deployment Radio Access Techniques (RATs), but it may be utilized also in the future releases of legacy systems like LTE. Additionally for LTE, new similar kind of handover feature could be introduced, which would allow the radio network to handle UD's mobility between cells without the UN being aware of the handovers. The reason is that LTE requires UE measurements and reporting and handover procedure has too much signalling and delay in this system. Usually it is stated that with LTE only stationary UEs can be served with small cells. However, in future communicating systems agile mobility support should also be enabled for dense small-cell deployments, or not anymore forming traditional cells just control areas or so called "hyper-cells".

As described above, the present beacon signal may contain various information elements (like UD ID, UD capability info, TX power level or power headroom, CSI, reference signal etc.) needed by the network and there may be several kinds of beacons for various purposes like RA, idle mode and connected mode, active time and opportunity for DRX time for example. Beacon transmission interval could be controlled by the network dynamically so high mobility UDs are sending beacons more often to provide more accurate location information to the network. If UD is not moving or UD is in idle mode, the UD could beacon signals more infrequently to optimize power consumption and spectrum usage.

It is also realized the all the embodiments of the present UD, AN, and central network controller have corresponding methods which are part of the present solution.

Furthermore, any method according to an embodiment of the present disclosure may be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the present devices comprise the necessary communication capabilities in the form of e.g., functions, means, units, elements, etc., for performing the present solution. Examples of other such means, units, elements and functions are: processors, memory, transceivers, control logic, encoders, decoders, mapping units, multipliers, decision units, selecting units, switches, interleavers, de-interleavers, modulators, demodulators, inputs, outputs, antennas, amplifiers, RX unit, TX unit, DSPs, MSDs, TCM encoder, TCM decoder, interfaces, communication protocols, etc. which are suitably arranged together.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present disclosure is not limited to the embodiments described above, but also relates to and incorporates all embodiments within the scope of the appended independent claims.

What is claimed is:

1. A user device, comprising:
a transceiver configured to:
synchronise with a radio communication network; and
broadcast a beacon signal comprising at least one reference signal to one or more access node devices of the radio communication network,
wherein when the user device is connected to at least one access node device of the radio communication network, identity information of the user device is omitted from the beacon signal, and the beacon signal is not addressed to a specific access node device of the radio communication network.

2. The user device according to claim 1, wherein the beacon signal further comprises identity information of the user device.

3. The user device according to claim 1, wherein the beacon signal further comprises one or more information elements including at least one of: capabilities of the user device, transmit power level of the beacon signal, power headroom for the beacon signal, channel state information associated with the beacon signal, and service provider identity for the user device.

4. The user device according to claim 1, wherein the transceiver further is configured to broadcast the beacon signal using a dedicated broadcast channel of the radio communication network.

5. The user device according to claim 1, wherein the transceiver further is configured to:
receive a beacon response signal including connection setup information; and
establish a connection with the radio communication network based on the connection setup information.

6. The user device according to claim 5, wherein the transceiver further is configured to:
receive a beacon control signal including beacon transmission interval control information; and
broadcast beacon signals according to the beacon transmission interval control information.

7. An access node device for a radio communication network, the access node device comprising:
a transceiver configured to receive a broadcast beacon signal from a user device synchronised with the radio communication network; and
a processor configured to derive information from the received broadcast beacon signal and to use the derived information in a network procedure of the radio communication network,
wherein when the user device is connected to at least one access node device of the radio communication network, identity information of the user device is omitted from the broadcast beacon signal, and the broadcast beacon signal is not addressed to a specific access node device of the radio communication network.

8. The access node device according to claim 7, wherein the network procedure comprises at least one of: a random access procedure, a joint procedure for assigning a serving access node device to the user device, a channel estimation procedure, a radio resource management procedure, or mobility control procedure of the user device.

9. The access node device according to claim 7, wherein the transceiver further is configured to transmit a beacon control signal to the user device, the beacon control signal comprising beacon transmission interval control information.

10. The access node device according to claim 7, wherein the transceiver is further configured to forward the derived information to one or more further access node devices of the radio communication network, and to receive further information derived from the broadcast beacon signal from one or more further access node devices of the radio communication network; and
the processor is further configured to, based on the derived information and the received information, decide which of the access node devices of the radio communication network shall connect to the user device.

11. The access node device according to claim 7, wherein the transceiver is further configured to:
forward the derived information to a central network controller; and
receive connection setup information from the central network controller, the connection setup information indicating at least one access node device of the radio communication network to which the user device shall establish a connection.

12. The access node device according to claim 7, wherein the transceiver is further configured to transmit a beacon response signal to the user device, the beacon response signal comprising connection setup information indicating at least one access node device of the radio communication network to which the user device shall establish a connection.

13. A central network controller for a radio communication network, the central network controller comprising:
a transceiver configured to receive, from at least one access node device of the radio communication network, information derived from a beacon signal originally broadcasted by a user device; and
a processor configured to based on the information received from the at least one access node device decide which access node device of the radio communication network shall connect to the user device, and to assemble connection setup information indicating at least one access node device of the radio communication network to which the user device shall establish a connection;
wherein the transceiver is further configured to forward the connection setup information to at least one access node device which shall establish a connection to the user device; and
wherein when the user device is connected to at least one access node device of the radio communication network, identity information of the user device is omitted from the beacon signal, and the beacon signal is not addressed to a specific access node device of the radio communication network.

14. A method, comprising:
synchronising, by a user device, with a radio communication network; and
broadcasting, by the user device, a beacon signal comprising at least one reference signal to one or more access node devices of the radio communication network;
wherein when the user device is connected to at least one access node device of the radio communication network, identity information of the user device is omitted from the beacon signal, and the beacon signal is not addressed to a specific access node device of the radio communication network.

15. A method, comprising:
receiving, by an access node device for a radio communication network, a broadcast beacon signal from a user device synchronised with the radio communication network;
deriving, by the access node device, information from the received broadcast beacon signal; and
using, by the access node device, the derived information in a network procedure of the radio communication network;
wherein when the user device is connected to at least one access node device of the radio communication network, identity information of the user device is omitted from the broadcast beacon signal, and the broadcast beacon signal is not addressed to a specific access node device of the radio communication network.

16. A method, comprising:
receiving, by a central network controller for a radio communication network, from a plurality of access node devices of the radio communication network, information derived from a beacon signal originally broadcasted by a user device;

deciding, by the central network controller, based on the information received from at least one access node device which access node device shall connect to the user device;

assembling, by the central network controller, connection setup information indicating at least one access node device of the radio communication network to which the user device shall establish a connection; and forwarding, by the central network controller, the connection setup information to at least one access node device which shall establish a connection to the user device;

wherein when the user device is connected to at least one access node device of the radio communication network, identity information of the user device is omitted from the beacon signal, and the beacon signal is not addressed to a specific access node device of the radio communication network.

* * * * *